March 2, 1954  R. MILLER  2,670,595
HIGH-PRESSURE SUPERCHARGING SYSTEM
Filed Oct. 19, 1949  5 Sheets-Sheet 1 d - EXHAUST OPENS
a - INLET OPENS
b - EXHAUST CLOSES
c - INLET CLOSES
c-e : EXPANSION
e-f : COMPRESSION

Inventor
Ralph Miller
by Parker & Carter
Attorneys

March 2, 1954     R. MILLER     2,670,595

HIGH-PRESSURE SUPERCHARGING SYSTEM

Filed Oct. 19, 1949     5 Sheets-Sheet 2

Inventor
Ralph Miller.
by Parker & Carter
Attorneys

March 2, 1954 R. MILLER 2,670,595
HIGH-PRESSURE SUPERCHARGING SYSTEM
Filed Oct. 19, 1949 5 Sheets-Sheet 4

Inventor
Ralph Miller
by Parker & Carter
Attorneys

Patented Mar. 2, 1954

2,670,595

UNITED STATES PATENT OFFICE 2,670,595

HIGH-PRESSURE SUPERCHARGING SYSTEM

Ralph Miller, Milwaukee, Wis.

Application October 19, 1949, Serial No. 122,167

13 Claims. (Cl. 60—13)

This invention relates to four-stroke cycle internal combustion engines.

This application is a continuation in part of my application Serial No. 590,401, filed April 26, 1945, now abandoned, for four-stroke cycle internal combustion engines.

It is well known that the power that can be delivered by internal combustion engines of the four-stroke cycle type as now constructed is limited by the temperatures at which engines can operate without damage to the materials of which the engines are constructed. In most engines the cylinders at full load are charged with materially more air than is necessary for the complete combustion of the fuel, but if sufficient fuel were admitted to the cylinders for completely utilizing all the available air in combustion of the fuel, the temperatures in the cylinders would be so high as to destroy the engines.

One of the objects of this invention is to increase the power which an engine can deliver by lowering the temperature of the charge in the cylinders at the end of the compression stroke.

A further object is to provide an improved cycle of operation for a four-stroke cycle internal combustion engine.

Another object is to lower the initial compression temperature of the charge and thereby lower the cycle mean temperature to reduce the heat load and temperature stresses in the engine.

Another object is to so operate an engine as to permit greater loads to be carried by an engine without increasing the cycle mean temperature.

Still another object is to cool the air charge after it leaves the manifold and before the beginning of the compression stroke.

Another object is to effect a lowering of the temperature of the charge at the beginning of the compression stroke by expanding the charge during a part of the intake stroke.

A further object of this invention is to provide an engine with an intake charge at a higher pressure than is commonly employed and then by closing the intake valve prior to the completion of the intake stroke to expand the charge in the cylinder as the piston continues its downward travel, thus reducing the temperature and pressure of the charge.

It is also an object to supercharge the engine with air that has been cooled prior to admission to the engine cylinders, and then further cooling the charge by expansion of the same during the intake stroke.

It is also an object of this invention to effect better scavenging of an engine of the four-stroke cycle type.

A further object is to provide an engine of this type with a greater pressure differential between the intake manifold and the exhaust manifold, so that a single exhaust duct may be used for all of the cylinders of a multi-cylinder engine.

Other objects will appear from time to time in the course of the specification and claims.

My invention is illustrated more or less diagrammatically in the accompanying drawings wherein.

Like parts are indicated by like characters throughout the specification and drawings.

Figure 1:
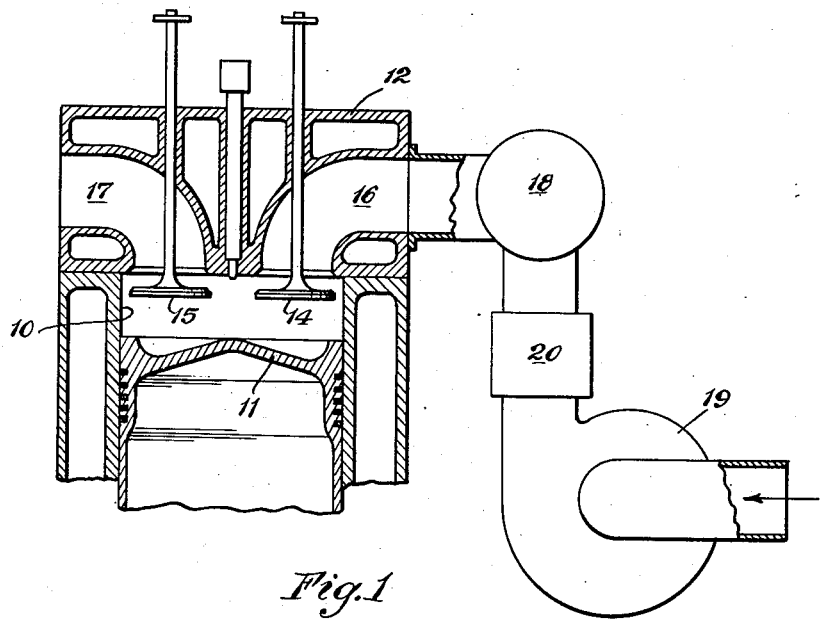
Figure 1 is a fragmentary sectional view of a four-stroke cycle engine of the diesel or fuel injection type to which the improvements embodying my invention may be applied.

In Figure 1, I have shown a typical four-cycle engine cylinder of the diesel type in connection with which my invention may be used. In this figure, 10 represents an engine cylinder in which a piston 11 reciprocates. 12 is the cylinder head in which an intake valve 14 and an exhaust valve 15 are arranged in the usual manner. These valves may be actuated in any suitable manner, for example, through cam mechanisms (not shown), to open and close communication with the cylinder and the intake port 16 and exhaust port 17 respectively. The valves 14 and 15 may be held in their closed positions by the usual springs or other means (not shown). The intake port 16 is connected with a manifold 18 to which other cylinders of the engine may be similarly connected and the manifold may be supplied with air by means of a compressor or pump 19 of any suitable type, and preferably the air in passing from the pump to the manifold passes through an air cooler 20.

In the use of the engine described, the supercharging by means of a blower or pump 19 is preferred, although it is not intended to limit this invention to the use of a specific supercharger. Preferably, however, the air is compressed to a substantially higher pressure than is ordinarily employed in engines of this type. The raising of the pressure of the air results in a corresponding rise in the temperature of the air and by operating at an intake pressure in excess of that ordinarily used, the air discharged from the pump 19 will be at a materially higher temperature than air compressed to ordinary supercharging pressures, and this in turn makes possible the removing of a considerable amount of heat from the air used for supercharging. For example, on locomotives where the outside atmosphere is used for cooling the supercharging air, a considerable amount of heat may be removed by means of the outside temperature, if there is a sufficient temperature differential between the atmosphere and the compressed supercharging air. The advantages of supercharging at higher pressures than ordinarily used will be hereinafter more fully explained.

Figure 2:
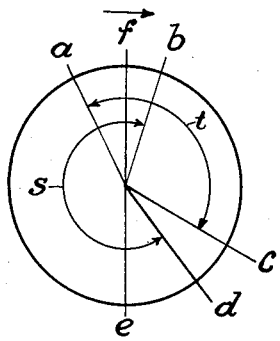
Figure 2 is a diagram showing the timing of the valves in an engine having improvements embodying my invention applied thereto.

In accordance with my invention, after the exhaust stroke, the intake valve is opened to admit air to the cylinder. Ordinarily, the intake valve remains open substantially throughout the intake stroke of the engine, but in accordance with my invention, I close the intake valve before the piston reaches the lower dead center position of the intake stroke. Consequently, after closing of the intake valve, the charge in the cylinder expands with a resulting decrease in pressure and temperature of the charge. Consequently, at the beginning of the compression stroke, the air will be at a lower pressure and temperature than during the first portion of the intake stroke. The valve-timing diagram in Figure 2 shows the intake valve closed at "c" and, consequently from "c" to "e," the charge in the cylinder will be expanded and cooled. From "e" to "f," the charge in the cylinder is compressed by the up-stroke of the piston and firing takes place somewhere near the end of the compression stroke. The burnt charge then forces the piston down during the working stroke and the exhaust valve is opened approximately at "d" and remains open from "d" to "b," as indicated by arc "s." The intake valve opens at "a" and scavenging takes place from "a" to "b." When the exhaust valve closes at "b," the intake valve remains open until "c" and the cycle is repeated. The arc "t" indicates the portion of the cycle during which the intake valve 14 remains open.

Figure 3:
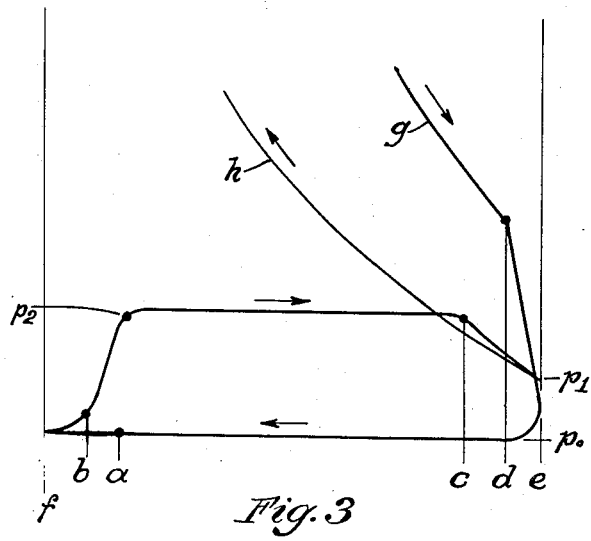
Figure 3 is a portion of a pressure volume diagram showing the operation of an engine having improvements embodying my invention applied thereto.

Beginning with the power stroke of the engine, the gas pressure in the cylinder drops along line "g" in Figure 3 as the piston of the engine travels downwardly. Before bottom dead center "e" is reached, the exhaust valve 15 opens at "d" in Figure 2 which causes a drop in pressure in the curve "g," Figure 3, to the line P₀, which is the back pressure in the exhaust system. During the upward stroke of the piston, exhaust gases are forced out through the exhaust valve and at the point "a" indicated in Figure 3, the intake valve is opened, and from "a" to "b" in Figures 2 and 3, both intake and exhaust valves 14 and 15 are open simultaneously. This is the scavenging period during which air under pressure from the compressor or blower 19 flows into the cylinder above the piston and forces the exhaust gases that remain in the clearance space out through the exhaust valve 15. At the point "b" in Figures 2 and 3, the exhaust valve closes while the intake valve remains open, so that air from the pump or compressor 19 quickly builds up the pressure in the cylinder space to the pressure $P_2$, which is the pressure maintained in the manifold 18.

The down-stroke of the piston from "b" to "c" in Figure 2 is also a power stroke, since the pressure $P_2$ is greater than the pressure on the underside of the piston 11. At the point "c" toward the end of the intake stroke, the intake valve 14 is closed to shut off the air supply from the manifold 18 and during the remainder of the stroke of the piston, the air in the cylinder will expand polytropically from "c" to "e," from the pressure $P_2$ to the pressure $P_1$. As the piston travels upwardly on the following stroke, from "e" to "f" in Figure 2, the air charge is compressed along the pressure line "h" shown in Figure 3. The upper end of the pressure volume diagram is not shown in Figure 3. Combustion takes place at the end of the compression stroke and the pressure expands downwardly on the following power stroke, as appears on pressure line "g," Figure 3.

While the closing of the intake valve prior to the completion of the intake stroke constitutes the preferred form of applying my invention to an engine, yet any other means for expanding or reducing the pressure of the charge in the engine cylinders may be employed with good results. For example, the exhaust valve or the intake valve may be opened for a short period of time during the compression stroke, or another valve may be provided which can be opened long enough to produce the desired reduction in pressure in the cylinder.

The gases in an engine cylinder pass through a wide range of temperatures during each cycle. The lowest temperature occurs at the beginning of the compression stroke or during the intake stroke. It may be in the order of 200° F. During the compression stroke, this temperature is gradually increased following a path where the final temperature $$T_2 = T_1 \times \left(\frac{V_1}{V_2}\right)^{n-1}$$

where "$T_1$" is the temperature of the charge in the cylinder at the beginning of the compression stroke, "$V_2$" is the clearance volume, "$V_1$" the piston displacement plus "$V_2$" and "$n$" is the compression exponent. The maximum temperature of the combustion is a function of the fuel burned per unit weight of air, therefore, increases with mean effective pressure. In the theoretical diagram in which there is no after burning, the expansion stroke temperature follows a path of polytropic expansion and the average temperature of this stroke increases with the final combustion temperature, which is the initial temperature of the expansion.

It can be shown that the temperatures occurring during the compression, combustion and expansion of the cycle at any given load and cycle efficiency is entirely a function of the initial compression temperature. Thus, if the initial compression temperature is lowered, all temperatures during the cycle will be lowered.

It follows from this that a given engine designed to withstand certain maximum combustion temperature will carry a higher mean effective pressure at these same temperatures when the initial compression temperature is lowered.

The invention herein described deals with methods of reducing the initial compression temperature of internal combustion engines. It is the object of this invention to so control the cycle temperatures that a greater quantity of heat may be converted into work per unit cylinder volume without increasing the average or mean temperature of the cycle.

When supercharging four-cycle engines, air is furnished to the intake manifold of the engine at a pressure greater than atmospheric pressure. The pressure may be created by any of the well-known types, such as a piston pump, roots blower, centrifugal or axial flow compressor. Such compressors may be driven directly from the engine, by separate means or by an exhaust gas turbine.

It is well known that, when air is compressed adiabatically, its temperature is increased, the temperature increase being a function of the effective compression ratio and the compression exponent of the air. Thus, when supercharging an engine to five pounds gauge pressure, the temperature of the air on the discharge side of the compressor, which is also the intake manifold of the engine, will be increased above the intake temperature of the compressor by about 65° F. The air charge taken into the engine cylinder is, therefore, 65° higher than the air charge in a non-supercharged engine; assuming room temperature at 70° F., then the temperature of the air taken in will be 65° plus 70°, or 135° F. At normal rated supercharging and non-supercharging brake mean effective pressure, each degree increase in the air intake temperature increases the cycle mean temperature by about 2 degrees. Thus, while an increase in the air intake manifold pressure permits increasing the mean indicated pressure approximately in the ratio of the absolute manifold pressure with the same cycle mean temperature, and therefore, heat load on the engine, as exists in the non-supercharged engine, the temperature increase in the manifold resulting from the compression of the air, as explained, has the opposite effect and the mean indicated pressure is inversely proportional to the intake manifold temperature for constant cycle mean temperature.

The power output per unit cylinder volume of a supercharged engine can, therefore, be increased considerably by cooling the supercharging air between the compressor and the engine intake valve. Where cold water is available, such cooling is easily accomplished by passing the air through a conventional air to water heat exchanger.

If the temperature of the air charge at point "c," when intake valve 14 closes, is $T_2$, then the temperature at the end of the stroke, when the pressure is $P_1$, is $$T_1 = T_2 \times \left(\frac{P_1}{P_2}\right)^{\frac{k-1}{k}}$$

where "$k$" is the expansion exponent.

The effective supercharging pressure at the end of the expansion from "c" to "e" is $P_1$, which is the initial compression pressure.

If the engine had been supercharged to pressure $P_1$ in the usual manner by carrying this pressure in the manifold 16, the $T_1$ temperature at the beginning of the compression would have been $$T_1 = T_{atm} \times \left(\frac{P_1}{P_{atm}}\right)^{\frac{k-1}{k}}$$

"$T_{atm}$" and "$P_{atm}$" being respectively atmospheric temperature and pressure. This temperature is too low at normally used pressures to enable effective cooling between the compressor and manifold. For example, with a compressor discharge pressure of 5 pounds per square inch gauge, the temperature would be 155° F. (with 90° F. atmospheric temperature), and it would in most cases not be practical to cool below 125° F. or a reduction of 30° F.

In accordance with my invention, the manifold pressure is raised to a pressure above the final supercharging pressure $P_1$. Thereby, the air is heated to a higher temperature in the compressor and so can be cooled a greater number of degrees.

For example, the blower discharge pressure may be 18 pounds per square inch gauge, which would produce a temperature of about 275° F. This air can readily be cooled to 125° F. The expansion from 18 pounds per square inch gauge pressure at "c" to 5 pounds pressure at "e" would result in a temperature of about 78° F. at the end of the expansion.

In this example, the $T_1$ temperature at pressure $P_1$ at the begining of the compression stroke has been lowered from 155° to 78° or 77° by cooling the manifold temperature to only 125° F. It can be shown that the temperature at pressure $P_1$ will be lowered $= t_c \times \left(1 - \left(\frac{P_1}{P_2}\right)^{.283}\right)$ degrees F.

where $t_c$=temperature in cylinder at beginning of expansion at point "c," Figure 3, $P_2$=pressure at "c," $P_1$=pressure at "e."

Theoretical analysis confirmed by actual tests shows that the degree of air cooling shown in the example above will permit increasing the brake mean effective pressure from 115 pounds per square inch as a standard non-cooled rating to 140 pounds brake mean effective pressure without increasing the heat flow to the water jackets. This does not include the work done on the intake stroke.

The invention is in effect a new internal combustion engine cycle in that the intake stroke becomes a working stroke and expansion stroke. The manifold pressure may be raised to any desired value and the expansion ratio from $P_2$ to $P_1$ may also be selected to any desired value by adjusting the point of intake valve closing.

For example, the air may be admitted at 100 pounds gauge pressure and cooled to 350° F. before entering the manifold. If it is desired to operate with 5 pounds gauge supercharging pressure, the intake valve would be closed about 60° after top dead center. Expansion $P_2$ to $P_1$ would then be from 115 pounds absolute to 19.7 pounds absolute and the end temperature at $P_1$ at the beginning of the compression stroke would be 510° absolute (50° F.).

This high pressure cycle would increase the output from the engine provided the 100 pounds pressure is supplied from a source outside the engine. It further has the advantage that air cooling takes place at high temperature which reduces the size of the air cooler. With 100 pounds intake pressure, the intake stroke develops about 65 pounds mean effective pressure. Cooling to 50° F. initial compression temperature permits rating the power stroke at 160 pounds mean effective pressure. Thus, it is seen that a four-cycle engine using my system may be loaded to the equivalent of about 225 brake mean effective pressure without exceeding the heat stress of a non-supercharged engine at about 75 brake mean effective pressure.

In some present supercharging systems for four-cycle engines, a blower supplying air at pressures above atmosphere is driven by an exhaust gas turbine. The relatively low efficiency of this apparatus results in a high exhaust back pressure in relation to the blower discharge pressure. However, scavenging of the clearance space at the end of the exhaust stroke can be accomplished only if the supercharging pressure is substantially higher than the exhaust back pressure. Because this pressure difference is very small in some prior art systems, a plurality of exhaust pipes are used and it is necessary to so separate the individual exhaust pipes in a multiple cylinder engine so that a depression in the pressure waves set up in the exhaust pipe by the opening of the exhaust valves is timed to occur during the scavenging period when both exhaust and intake valves are open. This overlap period is usually about 140 crank degrees with the intake valve opening about 70° before top dead center on the exhaust stroke and the exhaust valve closing about 70° after top dead center on the following intake stroke. In an engine operating with 5 pounds gauge superchanging pressure, the average exhaust back pressure wave during scavenging may be no more than 1½ pounds gauge.

In my improved engine, if for example it is supercharged to 5 pounds gauge pressure at the beginning of the compression stroke due to expansion of the charge during the intake stroke, the scavenging pressure is higher than this pressure by such an amount that scavenging can be carried out effectively against the average exhaust back pressure existing in an exhaust manifold into which all the cylinders of a multiple cylinder engine are exhausting.

It is a characteristic of a gas turbine driven compressor that the higher the pressure level the greater becomes the difference between the compressor discharge pressure and the gas pressure to the turbine, which is the exhaust back pressure. Thus, when the blower discharge pressure is 5 p. s. i. g., the exhaust back pressure may be 3½ p. s. i. g. With the same turbocharger efficiency, the exhaust back pressure will be 13.9 p. s. i. g. when the blower discharge pressure is increased to 18.5 p. s. i. g. The differential pressure between air and exhaust manifolds has increased from 1.5 to 4.6 p. s. i. g.

Figure 8:
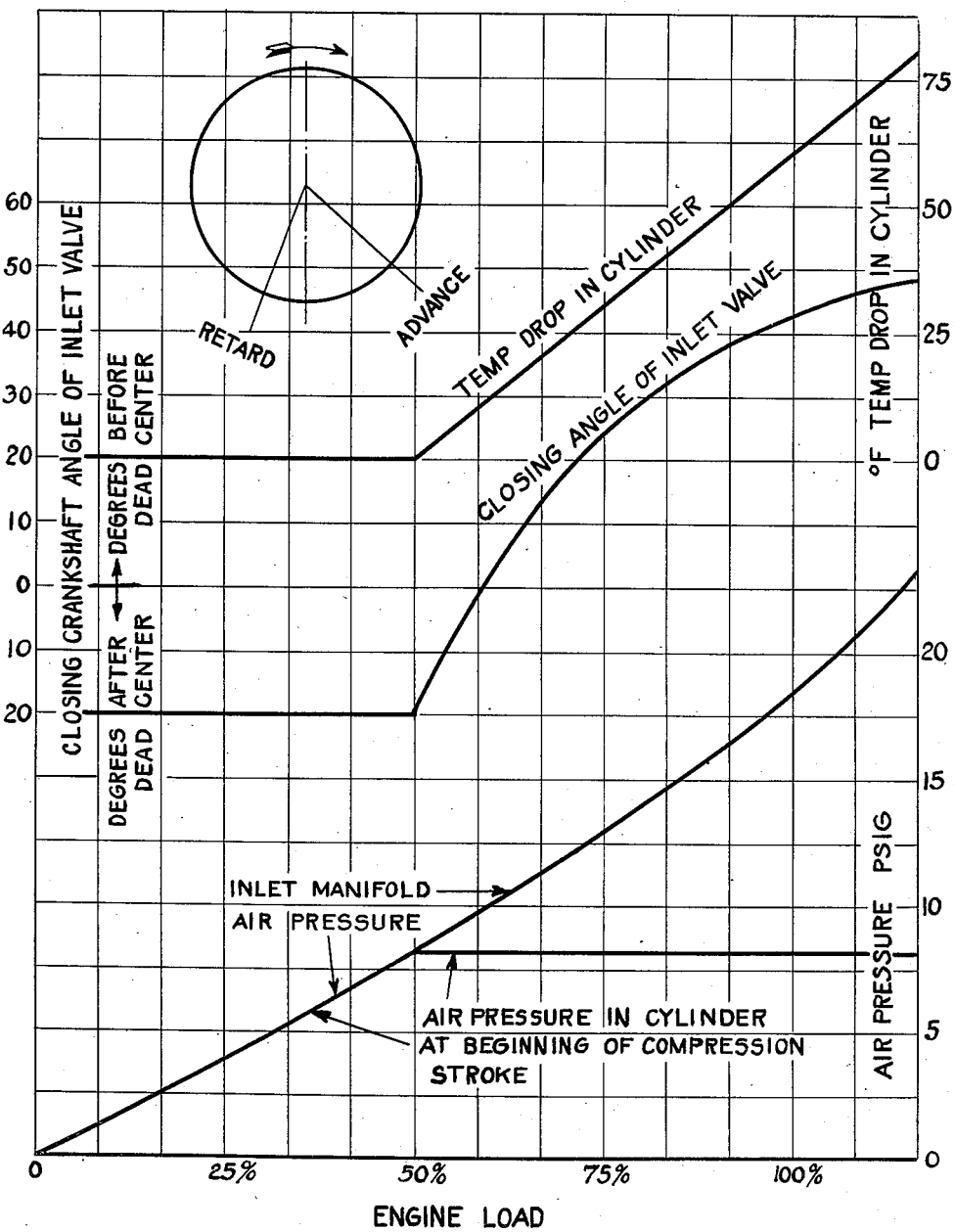
Figure 8 is a chart showing the pressure temperature relationships of the modified form of engine shown in Figures 6 and 7.

As the load decreases, less fuel is injected, the exhaust temperature falls causing a drop in turbine speed and the blower discharge pressure will follow the line "Inlet manifold air pressure," Figure 8. When the pressure falls in this manner, the temperature of the air also falls. Where it may be 280° F. at full load when the pressure is 18 p. s. i. g., it will be only 180° F. at half load when the pressure is 8 p. s. i. g. Thus, if the intercooling is adjusted for full load, the compression temperature will be too low when the load is reduced.

I propose, therefore, to provide automatic means to control the cooling by reduction of pressure expansion in the cylinder during the intake stroke in consonance with the variation in load.

For example, as shown in Figure 8, where at full load the inlet valve closes at 42° before bottom dead center, causing expansion from 18 p. s. i. g. to 8 p. s. i. g. with a resulting temperature drop of 60° F. The inlet valve closing is gradually and automatically retarded until at approximately half load, and all load below, a full cylinder of air is taken in and there is no expansion or temperature drop.

While this method of controlling and varying internal expansion cooling is preferred, I also can operate my engine by automatically varying the effective compression ratio in consonance with load. I accomplish this by holding the intake valve open during the entire intake stroke and during a part of the following compression stroke. The intake valve will automatically be closed later in the stroke with increasing load and manifold air pressure. At full load the blower air pressure may be as in the previous example, 18 p. s. i. g. The cylinder is filled at this pressure and as the piston starts the up-stroke, the inlet valve or exhaust valve or other valve controlled openings are kept open permitting some of the charge in the cylinder to be expelled. At some point in the up-stroke, all cylinder valves are closed and compression begins. This may, for example, take place at a point where the effective compression ratio is reduced to 10.

The compression pressure will then be 700 p. s. i. and the temperature 1410° F. absolute. This is the same pressure and temperature as will be obtained when the inlet valve closes before bottom dead center to expand the air from 18 p. s. i. g. to 8 p. s. i. g. when the compression begins at bottom dead center.

As the load is reduced and the air pressure from the blower decreases, the inlet valve is caused to close earlier so that the effective compression ratio is increased as the pressure of the air from the compressor decreases. Thus, it is that over a wide range of load the combined effective compression ratio of the compressor and the engine is substantially constant so that the pressure and temperature of the air in the cylinder at the end of the compression stroke do not increase over a wide range of loads.

Figure 9:
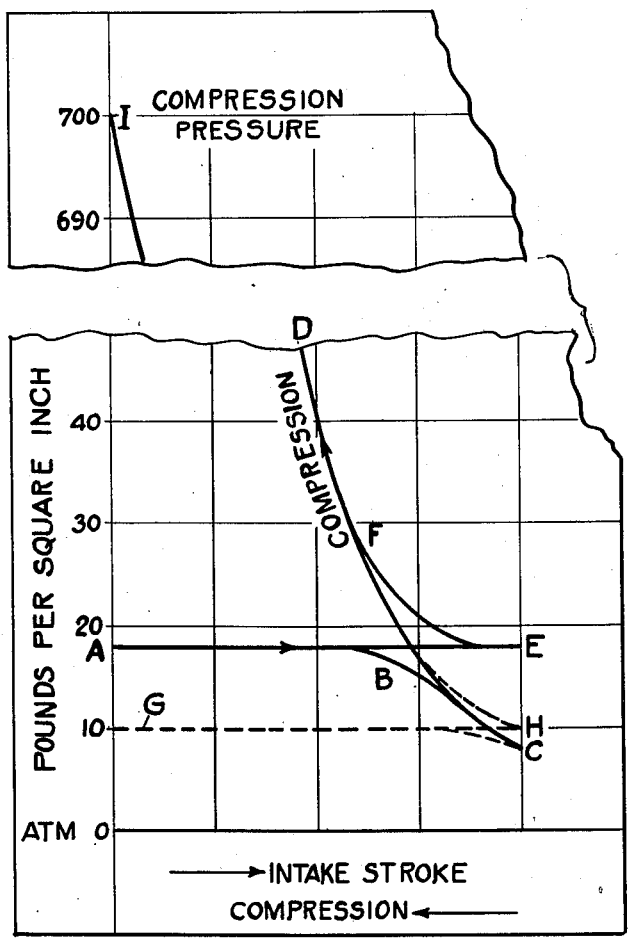
Figure 9 is a chart showing the compression relationship of the modified form of Figures 6 and 7.

The path of the air pressure in the cylinder during the intake and compression stroke is shown in Figure 9. In this example, the supercharging compressor delivers air at a pressure of 18 p. s. i. g. to the cylinder. When the inlet valve is timed to close before bottom dead center, the pressure follows path A, B, C, D, I. The compression begins with the pressure at C and reaches pressure I at the end of the stroke. When the load is reduced and the pressure falls, for example to 10 p. s. i. g., the pressure follows the path G, C, D, I. Compression begins at the same point as at full load and the compression reaches point I, as before. When the inlet valve is timed to close at various points after bottom dead center to control the effective compression ratio in consonance with engine load, the pressure follows the path A, E, F, D, I. Part of the charge is rejected from E to F so that the desired compression pressure "I" is reached.

When the load is reduced and the pressure falls, for example, to 10 p. s. i. g., the pressure follows the path G, H, D, I, the desired compression pressure I is reached by rejecting a smaller amount of the charge by closing the inlet valve earlier in the up-stroke.

At all loads where the manifold air pressure is greater than the pressure at C, the compression pressure and temperature is substantially constant. This results in high thermal efficiency and rapid, smoke-free load acceleration.

Figure 6:
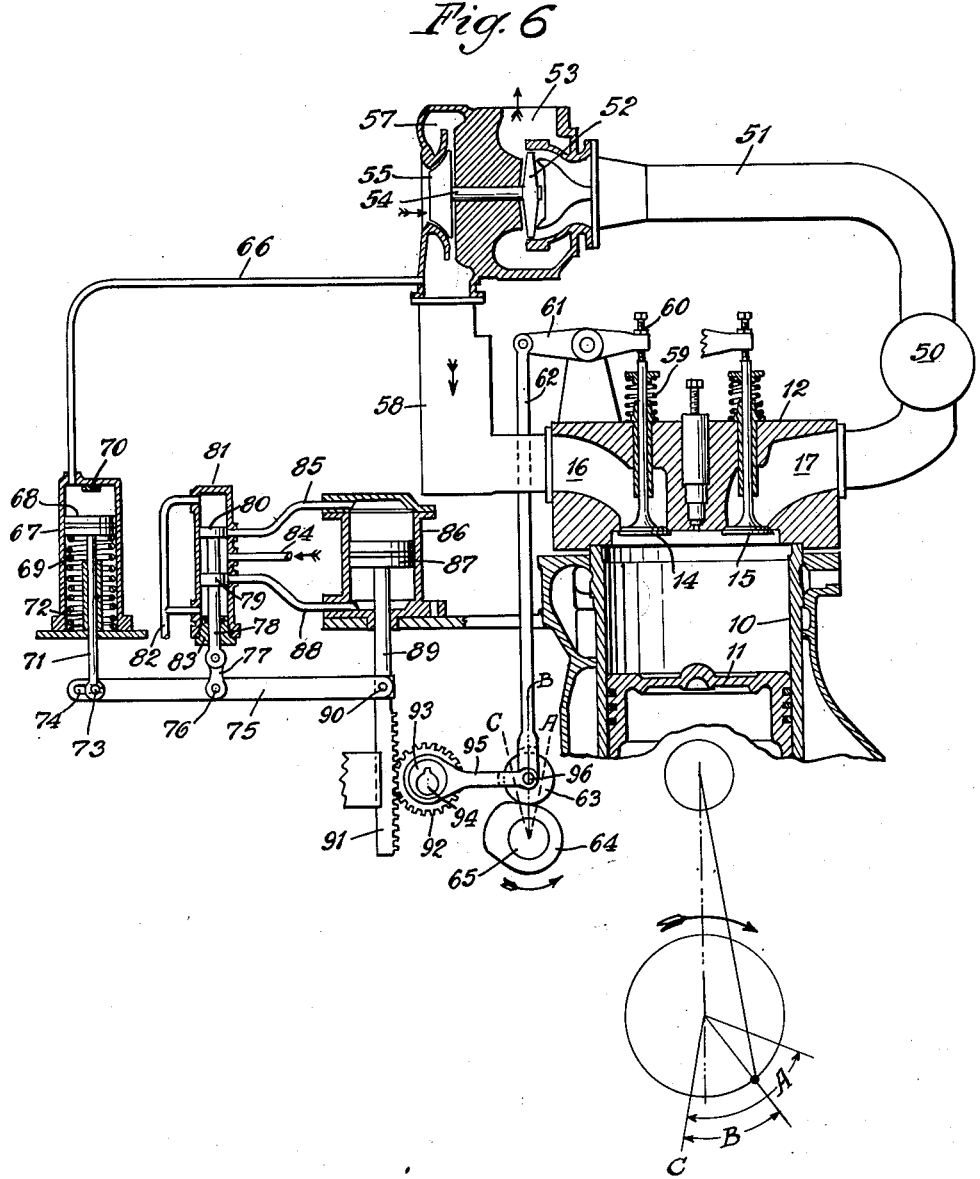
Figure 6 is a diagrammatic part section of a modified form of apparatus used to carry out my invention.
Figure 7:
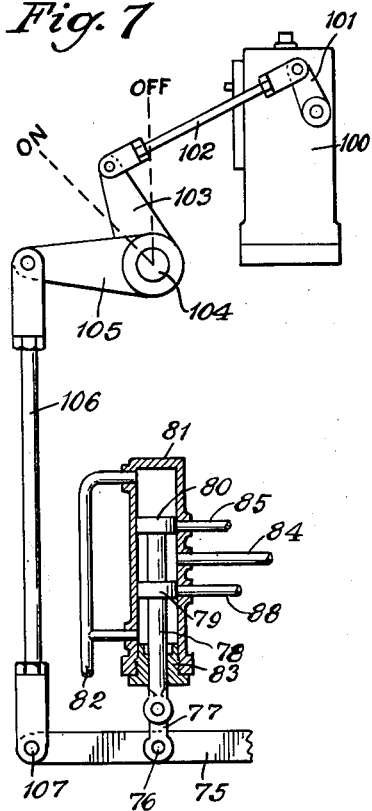
Figure 7 is a diagrammatic view of a further modified form.

In the modified form of engine shown in Figures 6 and 7, the exhaust valve 15 permits the products of combustion to pass out through the passage 17, the manifold 50, the passage 51 through exhaust gas turbine wheel 52 to exhaust at 53. The turbine wheel 52 drives the shaft 54 which in turn drives the compressor wheel 56, drawing air in, in the direction of the arrows, discharging it into the compressor or blower shroud 57, thence through the manifold 58 which also serves as an intercooler or means for cooling the air as it passes through the manifold on its way to the engine to the intake passage 16 where the intake valve 14 may be opened and closed as will hereinafter appear.

The intake valve 14 with its spring 59, adjustable tappet 60, lever 61, reach rod 62 and cam roller 63 is actuated by the cam 64 on the cam shaft 65 driven by any suitable connection from the crank shaft. It is the timing of the intake valve in this case that is automatically controlled to change the degree of internal expansion cooling by expansion in the engine to control the time of intake. Angular movement of the cam roller 63 about the shaft 65 through the angle A—C will vary the time of the intake valve.

The mechanism to acomplish this in this case, is depending on the pressure of the air discharged by the turbo-blower which in turn depends on the exhaust temperature which again in turn depends on the load carried by the engine. 66 is a duct leading from the blower shroud 57 to the cylinder 67. 68 is a piston in the cylinder 67 urged upwardly by the spring 69. 70 is a pad in the cylinder to limit the upward excursion of the piston 68. 71 is a piston rod guided by the sleeve 72. The pressure on the underside of the piston 68 is atmospheric. 73 is a pivot pin on the lower end of the piston rod 71 engaging a slot 74 in the lever 75. The lever 75 is pivoted at 76 to a link 77 which, in turn, is pivoted to a valve stem 78 carrying balanced piston valves 79 and 80 in the valve cylinder 81. The pipes 82 lead from the upper and lower ends of the valve cylinder to atmosphere. The valve stem 78 travels through the stuffing box 83. 84 is a pipe connected to the engine lubricating system and carrying engine oil lubricating pressure. It discharges into the cylinder 81. A pipe 85, controlled by the valve head 80 leads from the cylinder 81 to the upper end of the cylinder 86 above the piston 87 in that cylinder. The pipe 88 controlled by the valve head 79 leads from the valve cylinder 81 to the working cylinder 86 below the piston 87. The piston 87 carries a piston rod 89 pivoted at 90 to the lever 75. This rod also carries a rack 91 in mesh with a gear 92 carrying an eccentric 93 on a shaft 94 so that longitudinal movement of the rack 91 may rotate the gear 92 and so rotate the eccentric 93 in the yoke 95, the outer end of the yoke being pivoted at 96 to the pivot of the cam roller 63

Starting with the parts in the position shown in Figure 6, as the engine load increases, the turbine speed increases and so the air pressure in the shroud 57 increases, overcoming the spring 69, forcing piston 68 down. This causes the valves 79 and 80 to move downwardly connecting the upper end of the cylinder 86 with atmosphere and subjecting the lower end of the cylinder and the piston 87 to lubricating oil pressure. This causes the piston 87 to rise, rotates the gear 92 to move the cam roller 63 toward A and thus change the angle of advance of the intake cam to advance the time when the intake valve closes in consonance with the increase in air pressure as the load increases. Of course, the downward movement of the piston 87 results in returning the lever 75 to neutral position, closes the valves 79 and 80, close the passages 88 and 85, and the apparatus is locked and held in the proper position until a change in air pressure occurs.

When the load decreases, the movement is in the opposite direction and the roller 63 is moved back toward C so as to retard the time of closing of the intake valve, thus again compensating for the reduction in pressure so that the temperature and pressure of the starting of the compression stroke will be returned to normal.

In the modified form shown in Figure 7, the only difference is that the governor 100 by lever 101, link 102 to lever 103 on shaft 104 actuates link 105, connecting rod 106, pivoted at 107 to the outer outboard end of the lever 75. The operation is exactly the same except that, in this case, it is the governor that changes the timing of the intake valve rather than the pressure of air discharged by the blower. Of course, the same apparatus might equally well be applied to controlling the intake valve or to controlling the exhaust valve or both intake and exhaust valves or a separate dump valve, if desired.

Figure 4:
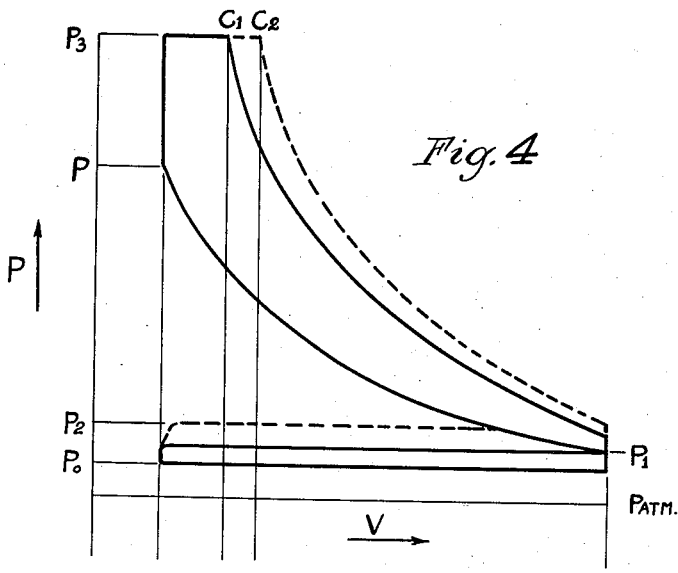
Figure 4 is a pressure volume diagram showing how increased power may be obtained from an engine operating in accordance with my invention, as distinguished from present engines.
Figure 5:
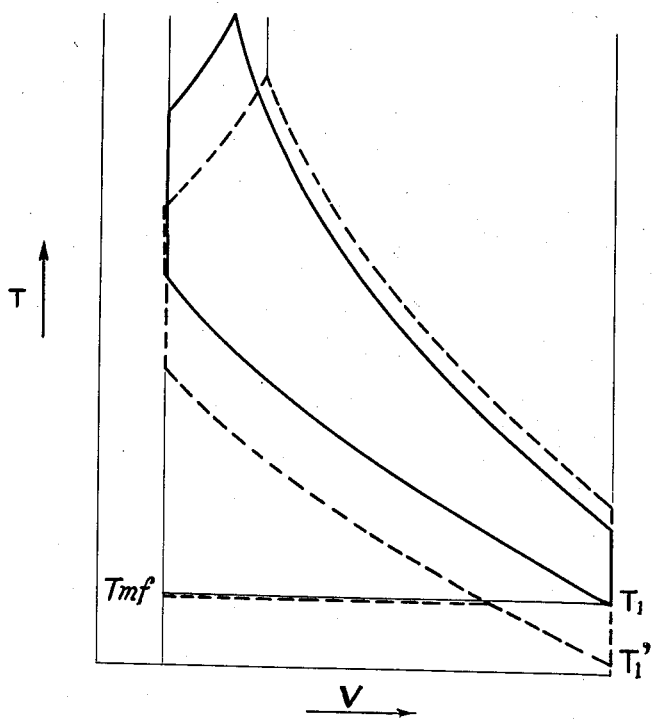
Figure 5 is a temperature volume diagram showing comparative temperatures in the engine operating in accordance with my invention and present engines.

Figure 4 shows a pressure volume diagram of a typical conventional supercharged diesel engine enclosed in the solid lines and cross-hatched with solid lines. The supercharging pressure is P, and the exhaust back pressure $P_0$. $P_{at}$ is the atmospheric line. The solid lines in Figure 5 show the temperatures for the conventional diesel engine during the intake stroke, compression stroke and combination intake and expansion stroke when the intake temperature is $T_{mf}$. This pressure and temperature diagram may represent the maximum load which can be carried by a given engine without exceeding the maximum permissible temperature. It will be seen that the temperature increases as the cut-off is made later and as the load is increased.

In Figure 4, the increase in the pressure-volume diagram obtained by operating the engine according to my invention is shown by the broken lines. In Figure 5, the corresponding temperatures in the same engine operating in accordance with my invention are shown in broken lines. In accordance with my invention, a greater load can be carried on a given cylinder at a lower temperature level of the gases or without exceeding the temperature level existing in the engine when supercharged by the conventonal method. This is shown in Figure 5 when the intake temperature is shown to be $T_{mf}$ as in the conventional engine. But whereas the latter maintains this same temperature, $T_1$, at the beginning of the compression stroke, in my system the cylinder charge is expanded polytropically from a pressure $P_2$ to $P_1$ at the end of the intake stroke and the result is a reduction of charge temperature from $T_{mf}$ to $T_1$ in accordance with well defined thermodynamic laws. This reduction of the initial compression temperature lowers the temperature of the compression, also the temperature at the end of the constant volume combustion at $P_3$. It will be seen therefore, that the cut-off in the P-V diagram can be extended from $C_1$ to $C_2$ without exceeding the maximum gas temperatures of the conventional cycle of later cut-off, which is accomplished by admitting more fuel, produces a greater mean effective pressure in the P-V diagram. Therefore, more power is generated.

The use, operation and function of my invention are as follows:

I employ an exhaust driven turbocharger which supplies highly precompressed air to the engine at a pressure which varies in direct relation to the load. If the load is high, the pressure of the air from the turbine is high; and if the load is low, the pressure of the air supply from the turbine is low. The highly precompressed air is then passed through an intercooler which withdraws the heat of precompression and cools the air to an approximately constant temperature for all loads.

The volume of air entrapped in the cylinder for compression is varied in inverse relation to the load. It should be understood that the exhaust valve 15 in Figure 6 could remain open during the suction stroke and variably closed during the compression stroke of this engine in a manner to entrap volumes of air that vary in inverse relation to the load on the engine. However, I have found that at present it is easier to variably close the inlet valve 14. Nevertheless, regardless of which valve is controlled, or by what mechanism it is controlled, the pertinent point is that the volume of air entrapped in the cylinder is varied in inverse relation to the load, so that, as the load increases, the volume of air entrapped in the cylinder decreases; the temperature rise of the air in the cylinder, due alone to compression, decreases, and as the temperature of the inlet air to the cylinder remains substantially constant for all loads, the final compression temperature of the air in the cylinder, before combustion, will decrease as the load increases. Therefore, more fuel can be burned as the load increases, and heavier loads can be carried.

In the claims, I have used the expression that one or more stated factors vary either directly or inversely as the load. For example, the claims state that volumes of air are entrapped for compression in the cylinder by the valve means, the volumes varying inversely with the load, and it should be understood that this is not a linear relationship. The same is true of the expression that fuel is supplied to the cylinder varying directly with the load and other similar expressions. This is only intended to mean that, as the load rises and falls, the dependent variable factor rises or falls as the case happens to be, depending upon whether a direct or inverse relation is stated.

Whereas, I have shown and described the preferred form of my invention with various details of it, it should be understood that numerous alterations, modifications, and substitutions can be made without departing from the essential theme. I have shown and described the variable valve timing as being over the entire load range, but it can be used equally as well only during a selected portion of the load range. For example, in Figure 8, the valve timing is constant from no load up to approximately one half full load, and variable valve timing follows up to the overloads. The dividing point at one half full load, as shown in this figure, could, of course, be any part load, and I therefore wish that the invention be unrestricted except by the appended claims.

I claim:

1. In an internal combustion engine adapted to operate under varying load conditions, including a cylinder, a piston movably mounted in the cylinder, a valve-and-port mechanism for the cylinder including valve means to provide for the entrapment of air in the cylinder during engine compression and intake and exhaust ports to provide for the entrance of air to and exhaustion of burnt gases from the cylinder, the time of closing of the valve means determining the volume of air entrapped in the cylinder, and means for supplying fuel to the cylinder varying directly with the load: a method of maintaining the final compression temperature of the air, at all loads carried by the engine, at least no greater than the no-load final compression temperature; including the steps of precompressing the air to an elevated temperature and pressure; withdrawing the heat of precompression from the precompressed air by cooling it to a reduced temperature while, at the same time, maintaining the pressure of the air approximately constant; supplying the precompressed cooled air to the cylinder through the valve-and-port mechanism at the elevated pressure and reduced temperature; and changing the timing of the valve means to vary the volume of precompressed cooled air entrapped for compression in the cylinder inversely with the load so that the temperature rise of the air in the cylinder, due alone to compression by the piston, will vary inversely with the load.

2. In an internal combustion engine adapted to operate under varying load conditions, including a cylinder, a piston movably mounted in the cylinder, a valve-and-port mechanism for the cylinder including valve means to provide for the entrapment of air in the cylinder during engine compression and intake and exhaust ports to provide for the entrance of air to and exhaustion of burnt gases from the cylinder, the time of closing of the valve means determining the volume of air entrapped in the cylinder, and means for supplying fuel to the cylinder varying directly with the load: a method of maintaining the final compression temperature of the air, at all loads carried by the engine, at least no greater than the no-load final compression temperature; including the steps of precompressing the air to an elevated temperature and pressure which vary directly with the load; withdrawing the heat of precompression from the precompressed air by cooling it to a reduced temperature while, at the same time, maintaining the pressure of the air approximately constant; supplying the precompressed cooled air to the cylinder through the valve-and-port mechanism at the elevated pressure and reduced temperature; and changing the timing of the valve means to vary the volume of precompressed cooled air entrapped for compression in the cylinder inversely with the load so that the temperature rise of the air in the cylinder, due alone to compression by the piston, will vary inversely with the load.

3. In an internal combustion engine adapted to operate under varying load conditions, including a cylinder, a piston movably mounted in the cylinder, a valve-and-port mechanism for the cylinder adapted and positioned to provide for the entrance, entrapment during engine compression, and exhaustion of burnt gases from the cylinder, the time of closing of the valve-and-port mechanism determining the volume of air entrapped in the cylinder, means for precompressing air to an elevated temperature and pressure, means for supplying the precompressed air to the cylinder through the valve-and-port mechanism at the elevated pressure, means for supplying fuel to the cylinder varying directly with the load, and means for maintaining the final compression temperature of the air in the cylinder, at all loads carried by the engine, at least no greater than the no-load final compression temperature, said last-mentioned means including means for withdrawing the heat of precompression from the precompressed air by cooling it between the precompressing means and the cylinder to a reduced temperature while, at the same time, maintaining the pressure of the air approximately constant, and means for varying the temperature rise of the air in the cylinder, due alone to compression, inversely with the load, including means for actuating the valve-and-port mechanism to vary the volume of precompressed, cooled air entrapped for compression in the cylinder inversely with the load.

4. In an internal combustion engine adapted to operate under varying load conditions, including a cylinder, a piston movably mounted in the cylinder, a valve-and-port mechanism for the cylinder adapted and positioned to provide for the entrance, entrapment during engine compression, and exhaustion of burnt gases from the cylinder, the time of closing of the valve-and-port mechanism determining the volume of air entrapped in the cylinder, means for precompressing air to an elevated pressure and temperature that vary directly with the load, means for supplying the precompressed air to the cylinder through the valve-and-port mechanism at the elevated pressure, means for supplying fuel to the cylinder varying directly with the load, and means for maintaining the final compression temperature of the air in the cylinder, at all loads carried by the engine, at least no greater than the no-load final compression temperature, said last-mentioned means including means for withdrawing the heat of precompression from the precompressed air by cooling it between the precompressing means and the cylinder to a reduced temperature while, at the same time, maintaining the pressure of the air approximately constant, and means for varying the temperature rise of the air in the cylinder, due alone to compression, inversely with the load, including means for actuating the valve-and-port mechanism to vary the volume of precompressed, cooled air entrapped for compression in the cylinder inversely with the load.

5. In an internal combustion engine adapted to operate under varying load conditions, including a cylinder, a piston movably mounted in the cylinder, a valve-and-port mechanism for the cylinder including valve means to provide for the entrapment of air in the cylinder during engine compression and intake and exhaust ports to provide for the entrance of air to and exhaustion of burnt gases from the cylinder, the time of closing of the valve means determining the volume of air entrapped in the cylinder, and means for supplying fuel to the cylinder varying directly with the load: a method of maintaining the final compression temperature of the air, at all loads carried by the engine, between the no-load final compression temperature and the full-load final compression temperature, and varying inversely with the load; including the steps of precompressing the air to an elevated temperature and pressure which vary directly with the load; withdrawing the heat of precompression from the precompressed air by cooling it to an approximately constant, reduced temperature for all loads while, at the same time, maintaining the pressure of the air approximately constant; supplying the precompressed, cooled air to the cylinder through the valve-and-port mechanism at the elevated pressure and constant, reduced temperature; and changing the timing of the valve means to vary the volume of precompressed, cooled air entrapped for compression in the cylinder inversely with the load so that the temperature rise of the air in the cylinder, due alone to compression by the piston, will vary inversely with the load.

6. In an internal combustion engine adapted to operate under varying load conditions, including a cylinder, a piston movably mounted in the cylinder, a valve-and-port mechanism for the cylinder including valve means to provide for the entrapment of air in the cylinder during engine compression and intake and exhaust ports to provide for the entrance of air to and exhaustion of burnt gases from the cylinder, the time of closing of the valve means determining the volume of air entrapped in the cylinder, and means for supplying fuel to the cylinder varying directly with the load: a method of maintaining the final compression temperature of the air, at all loads carried by the engine, between the no-load final compression temperature and the full-load final compression temperature, and varying inversely with the load; including the steps of precompressing the air to an elevated temperature and pressure; withdrawing the heat of compression from the precompressed air by cooling it to an approximately constant, reduced temperature for all loads while, at the same time, maintaining the pressure of the air approximately constant; supplying the precompressed, cooled air to the cylinder through the valve-and-port mechanism at the elevated pressure and constant, reduced temperature; and changing the timing of the valve means to vary the volume of precompressed, cooled air entrapped for compression in the cylinder inversely with the load so that the temperature rise of the air in the cylinder, due alone to compression by the piston, will vary inversely with the load.

7. In an internal combustion engine adapted to operate under varying load conditions including a cylinder, a piston, means for compressing air and supplying it to the cylinder, means for supplying fuel to the cylinder in direct relation to the load, and means for maintaining the final compression temperature of the air, at all loads, at least no greater than the no-load temperature, said last-mentioned means including means for cooling the air between the compressing means and the cylinder, and means for varying the temperature rise in the cylinder due alone to compression in inverse relation to the load, including means for varying the volume of air entrapped in the cylinder in inverse relation to the load.

8. The structure of claim 7, wherein the compressing means for the air varies the pressure thereof in direct relation to the load.

9. In an internal combustion engine adapted to operate under varying load conditions, including a cylinder, a piston movably mounted in the cylinder, a valve-and-port mechanism for the cylinder adapted and positioned to provide for the entrance, entrapment during engine compression, and exhaustion of burnt gases from the cylinder, the time of closing of the valve-andport mechanism determining the volume of air entrapped in the cylinder, means for precompressing air to an elevated temperature and pressure, means for supplying the precompressed air to the cylinder through the valve-and-port mechanism at the elevated pressure, means for supplying fuel to the cylinder varying directly with the load, and means for maintaining the final compression temperature of the air in the cylinder, at all loads carried by the engine, between the no-load final compression temperature and the full-load final compression temperature, and varying inversely with the load, said last-mentioned means including means for withdrawing the heat of precompression from the precompressed air between the precompressing means and the cylinder by cooling it to an approximately constant temperature for all loads while, at the same time, maintaining the pressure of the precompressed air approximately constant, and means for varying the temperature rise of the air in the cylinder, due alone to compression, inversely with the load, including means for actuating the valve-and-port mechanism to vary the volume of the precompressed, cooled air entrapped for compression in the cylinder inversely with the load.

10. In an internal combustion engine adapted to operate under varying load conditions, including a cylinder, a piston movably mounted in the cylinder, a valve-and-port mechanism for the cylinder adapted and positioned to provide for the entrance, entrapment during engine compression, and exhaustion of burnt gases from the cylinder, the time of closing of the valve-and-port mechanism determining the volume of air entrapped in the cylinder, means for precompressing air to an elevated pressure and temperature that vary directly with the load, means for supplying the precompressed air to the cylinder through the valve-and-port mechanism at the elevated pressure, means for supplying fuel to the cylinder varying directly with the load, and means for maintaining the final compression temperature of the air in the cylinder, at all loads carried by the engine, between the no-load final compression temperature and the full-load final compression temperatures, and varying inversely with the load, said last-mentioned means including means for withdrawing the heat of precompression from the precompressed air between the precompressing means and the cylinder by cooling it to an approximately constant temperature for all loads while, at the same time, maintaining the pressure of the precompressed air approximately constant, and means for varying the temperature rise of the air in the cylinder, due alone to compression, inversely with the load, including means for actuating the valve-and-port mechanism to vary the volume of the precompressed, cooled air entrapped for compression in the cylinder inversely with the load.

11. The method of claim 1 wherein the timing of the valve means is changed only above part load.

12. The structure of claim 3 characterized in that the means for actuating the valve-and-port mechanism changes its timing only above part load.

13. In an internal combustion engine adapted to operate in a predetermined load range, including a cylinder, a piston movably mounted in the cylinder, a valve-and-port mechanism for the cylinder including intake and exhaust ports to provide for the entrance of air to and the exhaustion of burnt gases from the cylinder, and valve means to provide for the entrapment of air in the cylinder during engine compression, the time of closing of the valve means determining the volume of air entrapped in the cylinder, and means for supplying fuel to the cylinder at a rate that varies as the load varies: a method of maintaining the final compression temperature of the air at all loads carried by the engine in a predetermined load range, at least no greater than the final compression temperature of the air at the lowest load in the range; including the steps of precompressing the air to an elevated temperature and pressure; withdrawing the heat of precompression from the precompressed air by cooling it to a reduced temperature; supplying the precompressed cooled air to the cylinder through the valve-and-port mechanism at the elevated pressure and reduced temperature; and changing the timing of the valve means to vary the volume of precompressed cooled air entrapped for compression in the cylinder in inverse relation to the load so that the temperature rise of the air in the cylinder, due alone to compression by the piston, will vary in inverse relation to the load.

RALPH MILLER.

References Cited in the file of this patent

UNITED STATES PATENTS

| Number | Name | Date |
|---|---|---|
| 1,301,972 | Ricardo | Apr. 29, 1919 |
| 1,680,505 | De Lautour | Aug. 14, 1928 |
| 1,856,024 | Büchi | Apr. 26, 1932 |
| 2,159,017 | Duncan | May 23, 1939 |
| 2,191,459 | Duncan | Feb. 27, 1940 |
| 2,202,227 | Noland | May 28, 1940 |
| 2,292,233 | Lysholm | Aug. 4, 1942 |
| 2,379,455 | Prince | July 3, 1945 |
| 2,422,162 | Borell | June 10, 1947 |
| 2,423,417 | Stokes et al. | July 1, 1947 |